April 25, 1961  J. H. SWARTZ  2,980,962
METHOD FOR AUTOMATIC MOLDING
Filed July 16, 1958  2 Sheets-Sheet 1

INVENTOR.
JOHN H. SWARTZ
BY
Frank A. Bauer
ATTORNEY

April 25, 1961 J. H. SWARTZ 2,980,962
METHOD FOR AUTOMATIC MOLDING
Filed July 16, 1958 2 Sheets-Sheet 2
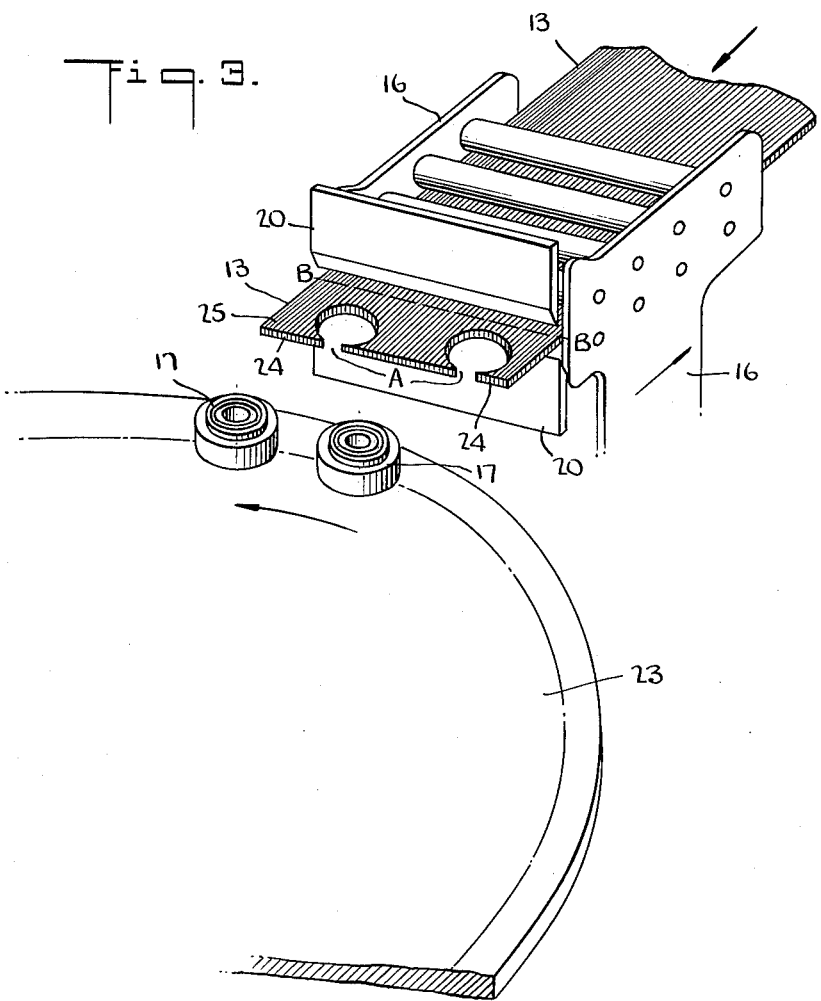
INVENTOR.
JOHN H. SWARTZ
BY
Frank G. Bauer
ATTORNEY

2,980,962
METHOD FOR AUTOMATIC MOLDING

John H. Swartz, Gladwyne, Pa., assignor to Linear Incorporated, Philadelphia, Pa., a corporation of Pennsylvania Filed July 16, 1958, Ser. No. 748,859

3 Claims. (Cl. 18—47.5)

This invention relates to the molding of rings and other shapes from a molding material and more particularly to a process of continuous, automatic molding.

In the automatic molding of articles from a molding composition limitations on the operation have been found, especially under conditions of continuous feed and the reclaiming of the unmolded composition. For example, where the feed of the moldable composition is tangentially into a rotatable molding apparatus in continuous form, the article is limited in size to less than the width of the web and must be positioned immediately adjacent to the edge of the web if there is to be ready release of the unused portion for return to the plasticizing means. These requirements impose serious limitations on the range of sizes of articles which can be molded concurrently. The molding composition of the continuous web must be in such a physical state as to withstand the tensions accompanying the feeds of the material to and from the molding operation. Thus, many of the molding compositions must be developed to an intermediate, if not advanced, stage of combination and solidification, complicating the preparation and wastefully limiting the reclaiming of surplus unmolded material.

It is an object of this invention to provide for the molding of materials widely variable in composition with the residual unmolded material reclaimed in a condition specially permitting ready and thorough reincorporation into the master batch.

The presentation of the moldable composition provides for synchronization of the feed with the molding operation and the motion of the molded material, and none of the material is wasted. Further, heat treatment of the molded material during the cure is efficient and easily controlled, preferably being applied directly to the molding composition during molding and followed by a separate cure.

It is a further object of this invention to cure the molded composition after molding by heat that is applied directly to the molding composition.

It is still another object of this invention to form molded objects of various sizes and cure the molded objects in sorted groups.

In the following specification the system of this invention is set forth and illustrated as applied to the molding of a typical, freshly mixed composition into circular formations, such as O-rings of various sizes, and in the accompanying drawings:

Fig. 3 is a perspective view of the passing of the molding composition into the molding operation.

Figure 1:
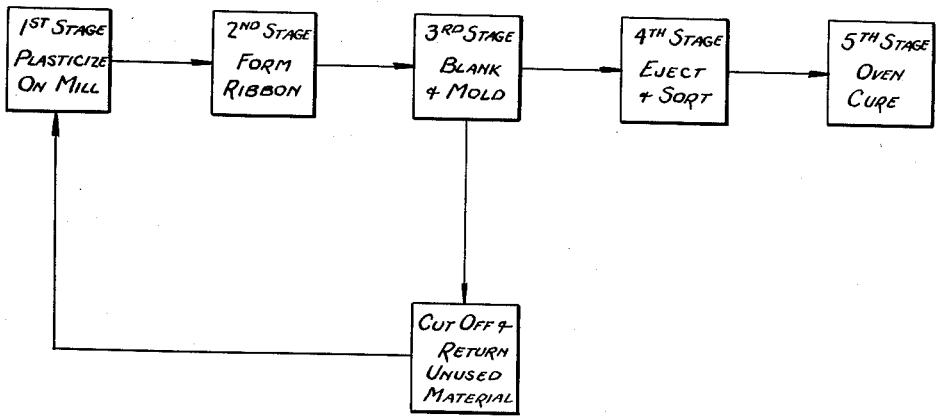
Fig. 1 is a flow sheet of the method of handling a moldable material according to this invention.

In general, this invention relates to a processing of plastics or elastomers in which the molding is of the compression type applied in an automatic molding machine. After cutting it from a ribbon, the article formed from the molding composition is cured at a rate ranging from one part every two minutes to approximately six parts per minute per molding cavity.

The molding composition is formed homogeneously in a mixing mill by working the ingredients into a thoroughly uniform mix. The molding composition is preferably removed from the mixing mill in the form of a continuous ribbon in synchronism with the motion of the molding cavities; thus, portions of the molding composition are successively presented to the molding cavities for formation and subsequent curing. The curing takes place in a temperature range from 250° to 400° F. The heating is preferably effected by heating the molded part rather than by heat conduction from the supporting member. According to one concept of this invention, the molding operation is adapted to form parts ranging in size by a factor greater than 15.

The molding composition is a thermosettable material in an uncured state having plasticity as characterized by a viscosity varying from extremely soft and tacky to relatively stiff. The ingredients of the molding composition are adapted to the requirements of the object to be formed. The molding composition is compounded by milling and is cut from a ribbon forming device in which the uncured composition is banded on a roll and from which roll it is slit into a continuous ribbon. The ribbon is fed from the cutting knives to a material conveyor and through the material conveyor to a feed mechanism including a feed assembly which intermittently feeds the ribbon to the mold cavities.

The composition in the ribbon form cut from the band is molded into the mold cavities, with a substantial portion of the ribbon unmolded and, consequently, unused. The uncut residue of the composition which is banded on the roll remains on the roll when the ribbon is removed. These unused portions of the band and ribbon are returned to the molding composition in the mixing mill and reincorporated into the mix. The feedback of these unused portions is processed so as to achieve a homogeneity of the molding composition after the reincorporation. The unused material is returned to the mix within a period which is relatively short with respect to the curing or aging period of the molding composition. It is handled so as to avoid as much as possible any thermosetting or aging action. Thus, the thermosettable material is reincorporated in substantially unaltered condition and the homogeneity of the molding composition is continuously maintained.

The action of the feed assembly is intermittent at the entrance to the molding operation and a synchronizing control is provided to synchronize the feed of the ribbon strip from the roll with the motion of the cavities. An article is formed in each cavity and is subsequently cured to a final product. The curing changes the molding composition so that it preserves the shape into which it is formed by the molding operation.

The curing may be by high frequency dielectric heating applied in said mold to the molded composition with individual control of the heat in the mold. An induction heating of mold cavity inserts could be employed and in turn heat the molding material within by thermoconduction. Either results in an immediate and primary cure of the molded objects which is followed by a secondary cure. The period of secondary curing and the speed of the curing is also controlled independently of the feed of the band and ribbon through the feed assembly. If the successive molded objects are formed in various sizes, the varying sizes are sorted into groups for the secondary curing.

Referring to Fig. 1, a flow sheet of the method of this invention shows a first stage plasticizing of the molding composition on mill rolls or other suitable equipment.

The molding composition forms a band on the back roll and a continuous ribbon of the compound is stripped from the roll. The ribbon formed in the second stage of the process is fed to the third stage where the molded article is formed and the blank ribbon is cut off. The unused material is returned to the first stage. The molded forms are cured or vulcanized in a third stage while they are moving to the unloading station. In the fourth stage the parts are ejected, dropped down a chute and through a sorting mechanism which separates the molded articles from each of the four quadrants of the molding turntable into four sections of the conveyor oven where the cure is completed.

Figure 2:
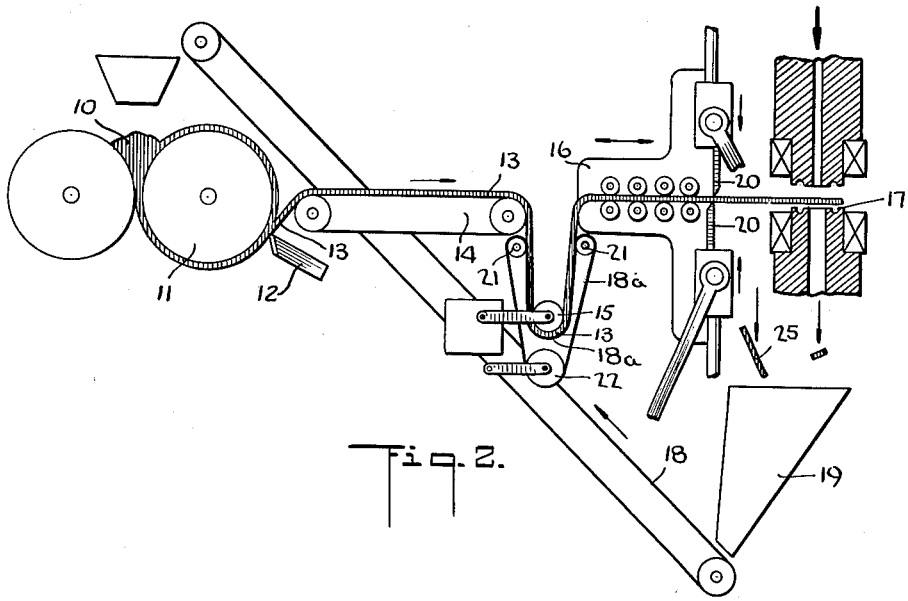
Fig. 2 is a side elevation of means for feeding the molding composition of this invention into a molding operation.

As shown in Fig. 2, a master batch 10 is formed into a band around a roll 11 from which band a ribbon 13 is cut by knives 12 at each side. The continuous ribbon 13 is fed from the knives across a material conveyor 14 around a dancer roll 15 to a feed assembly 16 which inserts the ribbon into the mold cavities 17 and these in turn are closed on the ends of the ribbon, punching out a form at each insertion. The ribbon is then withdrawn by a reverse action of the feed assembly and the punched end cut off by shears 20. The unused, cut-off material is returned to the master batch 10 by a return conveyor 18 to which it is fed by a chute 19.

A supporting belt 18a carries the ribbon 13 as it passes under the dancer roll 15. The belt 18a is hung on a pair of rolls 21 positioned adjacent the sides of the loop in ribbon 13 at the dancer roll 15. The belt 18a is held against the ribbon 13 as it passes over the roll 15 by an idler roll 22 riding in the bight of the slack of the belt 18a.

A mechanism for introducing the ribbon 13 of molding composition into the molding cavities is shown in perspective in Fig. 3. The feed assembly 16 is shown near the periphery of the cavity turntable 23 which carries mold cavities 17. The feed assembly 16 moves intermittently toward and away from the turntable 23 presenting the end of ribbon 13 between the mold cavities 17. After the molding, the feed assembly 16 retracts the ribbon 13, pulling it from around the cavities 17. As the feed assembly 16 and the turntable 23 are positioned with relation to each other so that the cavities 17 cut into the ribbon 13 adjacent its end, the ribbon can be easily withdrawn. Breaks A are caused in the end edge 24 of the ribbon 13 by ruptures of the ribbon 13 at those points by the pull of the retracting feed assembly 16.

After the retraction, the shears 20 chop the ribbon 13 along the line B—B forming the residue unused portion 25. Referring to Fig. 2, the portions 25 drop into the chute 19 and are carried to the mixing mill by the belt 18. The operation is then repeated by another insertion of the newly formed ribbon edge between the mold cavities 17.

When the mold cavities 17 are closed on the ribbon 13 they mold the part caught between the upper and lower cavities, cutting out a portion of the ribbon 13 represented by the circular holes shown in Fig. 3. Part of this cut-out portion may be unused and also cut out from the used molding composition. This unused cut-out portion of the molding composition may be suitably returned to the source mix via the chute 19.

The closed cavities 17 move out of the ribbon receiving station in the normal progress of the process. The cavities 17, heated by induction coils, apply the heat directly to the molding composition and are held closed only long enough to effect a cure sufficient to allow the molded objects to be removed from the cavities in form.

The process is then in the fourth stage shown in Fig. 1. In this stage the molded objects are removed from cavities 17. The removed molded parts are moved to a secondary curing stage indicated as the fifth stage in Fig. 1. When the molded objects emerge from this stage they are completely cured and the process is complete.

In this process molded objects of different patterns but having similar outside dimensions may be run concurrently. Such different objects can be separated and sorted at the removal stage prior to the secondary curing stage. The different objects can each be formed in a particular designated section of the turntable. Upon removal of the molded objects, the products of these particular sections can be separated, the one section from the other. Thus, a sorting is achieved. The sorted molded objects are then passed to the secondary curing stage.

In the automatic molding operation a continuous compression type of molding forms the composition into molded products. The material for molding is fed and treated in a form providing for the return of the unmolded material to the milling operation in substantially unaltered condition. That is, during the transfer to and positioning of the strip of composition in the molding means the molding composition does not undergo curing, and when returned unused it blends into the milled material. Thus, an economy of material is effected without spoiling the moldability of the moldable composition.

The times and temperatures and the flow of material are widely variable with different compositions and the final products to be formed. It is important in the application of the procedures to take advantage of this in coordinating the steps in all aspects to the most effective and efficient operation. Typical preferred materials and corresponding determinations of the successive steps are set forth in the following examples as illustrative of the wide adaptability of the process in practice.

*Example I*

A typical composition adaptable to molding by this process is compounded of the following ingredients:

| | Parts |
|---|---|
| Butadiene-acrylonitrile elastomer | 100 |
| Zinc oxide | 5 |
| Carbon black | 75 |
| Tributoxy ethyl phosphate plasticizer | 20 |
| Dipentamethylenethiuram tetrasulfide | 2 |
| Stearic acid | 1 |

These ingredients are blanded in a Banbury mixer, two-roll rubber mill or other mixing apparatus until a smooth, homogeneous mix is obtained.

The mixed compound has a slightly rubbery, putty-like consistency which, when warmed above room temperature, not only becomes tacky or sticky, but also starts to cure or set up. This compound may be cross-linked, or vulcanized for 15 seconds at 340° F. to produce a finished product.

It is necessary, therefore, to protect the cut-off portions of the ribbon from any heat build-up resulting from contact with the heated portions of the molding process means. This may be accomplished in three ways:

(1) Rapid retraction of the ribbon from the molding means immediately following the blanking operation.

(2) Rapid return of the unused portions of the molding material to the plasticizing means.

(3) Cooling of the portions of the plasticizing means in contact with the molding material to extract any accumulated heat from it.

*Example II*

Another typical example of a molding material adaptable to this process is compounded of the following ingredients:

| | Parts |
|---|---|
| Silicone gum | 100 |
| Benzoyl peroxide | 3 |
| Silica filler | 50 |

This molding material, in its uncured condition, is extremely soft and tacky and is scarcely self-supporting and ideally suited for processing by this molding method. This compound can be cured for 28 seconds at 290° F. to produce a finished product.

Example III

Another typical example of a molding material adaptable to this process consists of the following ingredients:

| | Parts |
|---|---|
| Chloroprene gum | 100 |
| Zinc oxide | 5 |
| Extra light calcined magnesium oxide | 4 |
| Semi-reinforcing furnace black | 140 |
| Butyl oleate | 10 |
| 2-mercaptoimidazoline | 1½ |

This material illustrates the stiff condition of consistency in its uncured state, but it is still readily processable by the claimed molding process. This compound can be cross-linked in 32 seconds at 348° F. to produce a finished product.

The material of the molding composition of this invention may be any basic polymer together with other compounding ingredients providing suitable properties for molding and subsequent curing. The molding composition is formed into a ribbon which is supported in its feed to the molding operation. In the specific embodiment described herein the molding composition is formed into a ribbon which need not be self-supporting. The plastic molding composition processed in this invention may have a wide variety of properties. In the uncured or unpolymerized state it need not be self-supporting, as illustrated by the manner of processing in the described embodiment.

The process of this invention is capable of handling plastics having low viscosity in the uncured state, that is having a low viscosity in proportion to the specific gravity of the composition. On the other hand, materials less flexible in the uncured state are equally processable. Any molding composition may be used which remains sufficiently unchanged prior to molding to permit reincorporation of the unused portions into the source mix. The molding composition is mixed by milling and is made up into a source mix from which it is transported to the molding operation where it is cut, formed and cured.

In the present processing there is thus a continuous milling of the raw mixture with the return material from the strip-trimming and die shaping steps. The entire composition is used without wastage. The homogeneous mill mixture is uniformly shaped into band formation and trimmed to a desired strip with feed back of the trimmings and traveling support for the strip on its way to the dies. This supporting feed includes a transmergence step receiving a continuous supply of the composition in strip formation and intermittently delivering the end thereof into successive die forming steps, each of which mold the desired article or articles from the delivered and cut-off end piece and discard the surplus material from the die shaping operation for return of this surplus to the milling mixture.

Various sizes and shapes of articles may be formed from each end piece and each article may be individually treated in its special die parts as to time, pressure, temperature, etc.

This will give desired completion of any initial partial cures of thermosetting compositions and determine the forms of the articles by the dies, leaving any final cure to be completed after delivery of the corresponding partially cured article from the die forming.

The processing is thus compact and efficient and also at the same time highly adaptable to widely varying materials and different articles without involving wastage at any point.

I claim:

1. The process of continuously molding heat hardenable plastic material into desired articles comprising milling and forming ingredients of a source mix of homogeneous, heat hardenable, moldable composition into strip form and passing said strip in desired condition from said milling step and varying the said feed of said strip and intermittently delivering end increments thereof in plastic condition to a molding operation, and separately and correspondingly successively operating on said end increments of said strip to molding of the desired article formation therefrom by separately shaping and molding material of each increment within die surfaces applied directly to said material for the corresponding article and forming the article from said material as distinguished from the remainder of the said increment, and during said shaping and molding of the article separating the entire unmolded remainder of each end increment in piece form from the corresponding article formation within the die and from said strip by withdrawing unmolded remainder from around the dies by rearward movement of the end of the strip, said unmolded remainder being separated in piece form from said strip by cutting therefrom, and heating the material of the article while within the die surfaces and while forthwith returning each of said separated pieces of said remainder material directly to the said source mix ingredients, and continuing, and completing the treatment of the corresponding molded articles to final form for delivery.

2. The process of continuously molding material into desired articles as set forth in claim 1 in which the moldable composition shaped into strip form comprises thermosetting material subjected to predetermined partial thermoset during said shaping of the article by molding to subsequent cure by heat treatment to the desired final consistency.

3. The process of continuously molding heat hardenable plastic material into desired articles comprising milling and forming ingredients of a source mix of homogeneous, heat hardenable, moldable composition into strip form and passing said strip in desired condition from said milling step and varying the said feed of said strip and intermittently delivering end increments thereof in plastic condition to a molding operation, and separately and correspondingly successively operating on said end increments of said strip to molding of the desired article formation therefrom by separately shaping and molding material of each increment within die surfaces applied directly to said material for the corresponding article and forming the article from said material as distinguished from the remainder of the said increment, after closing of the dies withdrawing the outer unmolded remainder of each end increment in piece form by rearward movement of the end of the strip to remove said peripheral remainder from around the closed forming dies, cutting said peripheral remainder from said strip, and heating the material of the article while within the die surfaces and returning each of said separated peripheral pieces of said remainder material directly to the said source mix ingredients, and continuing and completing the treatment of the corresponding molded articles to final form for delivery.

References Cited in the file of this patent

UNITED STATES PATENTS

| 1,754,502 | Denmire | Apr. 15, 1930 |
| 2,317,597 | Ford et al. | Apr. 27, 1943 |
| 2,593,667 | Gora | Apr. 22, 1952 |
| 2,838,801 | De Long et al. | June 17, 1958 |